United States Patent [19]
Pal

[11] 3,766,945
[45] Oct. 23, 1973

[54] FLUIDIC SYSTEM FOR MIXING TWO FLUIDS

[75] Inventor: Dharam Pal, Oxnard, Calif.

[73] Assignee: The United States of America as represented by the Secretary of the Navy

[22] Filed: Apr. 21, 1972

[21] Appl. No.: 246,311

[52] U.S. Cl. ................... 137/806, 137/823, 137/833
[51] Int. Cl. .............................................. F15c 1/14
[58] Field of Search ..................................... 137/81.5

[56] References Cited
UNITED STATES PATENTS

| | | | |
|---|---|---|---|
| 3,348,562 | 10/1967 | Ogren | 137/81.5 |
| 3,626,963 | 12/1971 | Ziermann | 137/81.5 |
| 3,273,377 | 9/1966 | Testerman et al. | 137/81.5 X |
| 3,327,726 | 6/1967 | Hatch, Jr. | 137/81.5 |
| 3,321,955 | 5/1967 | Hatch, Jr. | 137/81.5 X |
| 3,557,810 | 1/1971 | Lomas | 137/81.5 X |
| 3,561,464 | 2/1971 | Sher et al. | 137/81.5 |
| 3,589,381 | 6/1971 | Yamamoto | 137/81.5 |
| 3,602,240 | 8/1971 | Shinn et al. | 137/81.5 |
| 3,604,441 | 9/1971 | Rockwell, Jr. et al. | 137/81.5 X |
| 3,699,990 | 10/1972 | Ziermann | 137/81.5 |

*Primary Examiner*—Samuel Scott
*Attorney*—Richard S. Sciascia et al.

[57] ABSTRACT

A fluidic system for mixing two fluids in fixed or variable proportions including two sources of fluid, a pair of fluid amplifiers and a pressure tap off from a venturi discharge orifice to control the amplifiers. A variable resistor is provided on the control line of each fluid amplifier so that the proportions of the mixed fluids can be varied at will. With a particular mix ratio setting, the amplifiers assure delivery of the exact proportioned output.

5 Claims, 2 Drawing Figures

PATENTED OCT 23 1973  3,766,945

FLUIDIC SYSTEM FOR MIXING TWO FLUIDS

BACKGROUND OF THE INVENTION

1. Field of the Invention

The invention relates to a fluidic device for mixing two fluids in fixed or variable proportions at varying mixture demand rates.

2. Description of the Prior Art

The problem of mixing two fluids invariably involves precise and repeatable metering of each fluid separately in accordance with the changes in ratio and total quantity of the mixture. One system of mixing hot and cold water in desired ratios uses a thermostatically controlled three-way mixing valve. Mixing of the two fluids is accomplished by a sliding disc which by thermal action gradually covers the cold water inlet port as it uncovers the hot water inlet port thereby delivering a hotter mixture. The reverse motion of the disc yields a colder mixture. The device to date has been used in domestic heating controls. Other systems for mixing operations utilize pumps with variable output flow rates. Also flow-control valves are used as a means of flow modulation. These valves are usually controlled automatically either by electrical or mechanical means. These systems, since they have mechanical moving parts, are subject to relatively high initial and maintenance costs. Furthermore, the flow-control valves can develop problems like excessive internal leakage which produces poor flow modulating characteristics. Of more importance, the mechanical systems can have poor performance under extreme environments such as those of extremely high or low temperatures, corrosive fluids like seawater, or in applications subject to severe shock and vibration. A very promising method of improving the conventional mixing systems is by using fluidic flow modulating devices.

SUMMARY OF THE INVENTION

The present invention involves a device for mixing two fluids in fixed or variable proportions. It includes two sources of fluid, a pair of fluid amplifiers and a pressure tap off from a venturi discharge orifice on the line containing the combined fluids. A variable resistor is provided for each amplifier so that the proportions of the mixed fluids can be changed as becomes necessary.

Accordingly, an object of the present invention is to provide a fluidic system for mixing two fluids in fixed or variable proportions at varying mixture demand rates.

Another object of the invention is to provide a fluidic system with an insignificant amount of corrosion yet operates in a corrosive environment.

Still another object of the invention is to provide a fluidic system which is simple, reliable and relatively inexpensive both in cost and maintenance.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
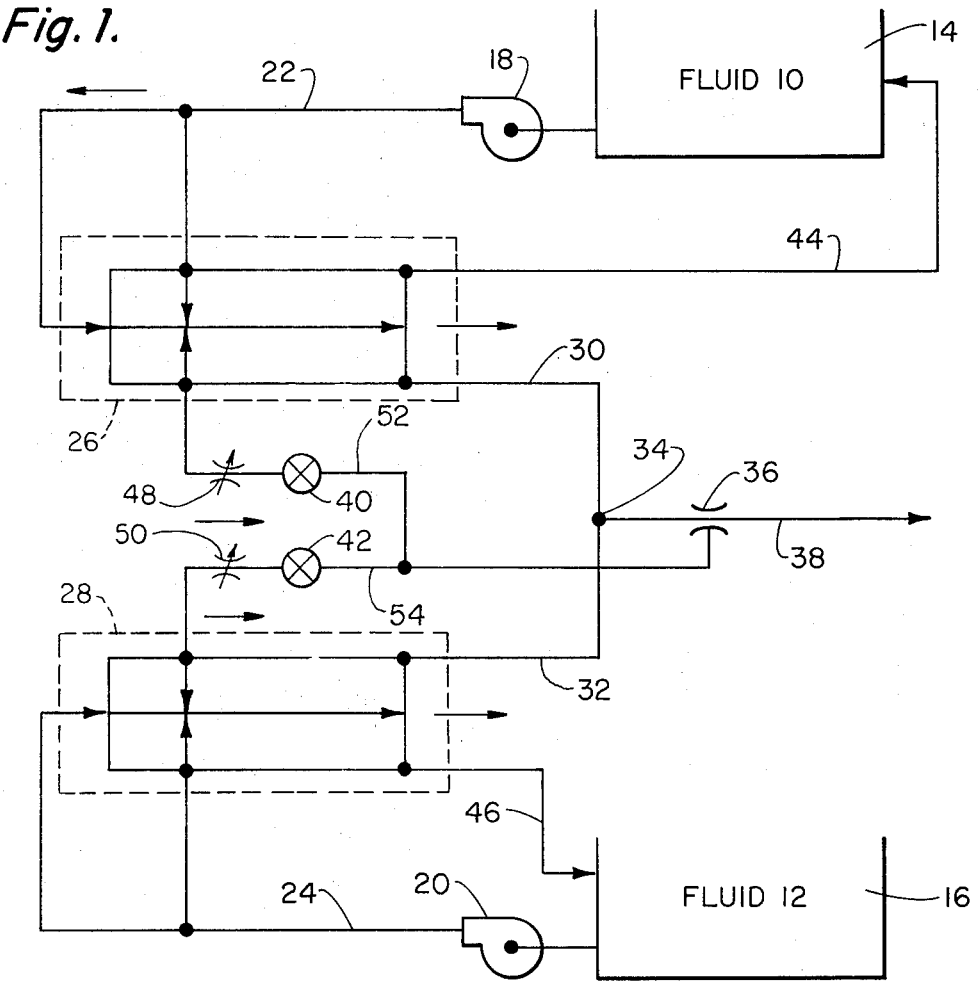
FIG. 1 is a diagrammatic view of the device showing the fluidic system with amplifiers for mixing two fluids.

The configuration of the present fluidic mixing system for corrosive fluids, including seawater and corrosive chemicals, is illustrated in FIG. 1. It will be noted that the system uses two proportional fluid amplifiers, one for each fluid. Fluids 10 and 12 are supplied by pumps 18 and 20 from suitable sources indicated as tanks 14 and 16 through lines 22 and 24 to the fluid amplifiers 26 and 28 and then through lines 30 and 32 to the mixing junction 34.

Figure 2:
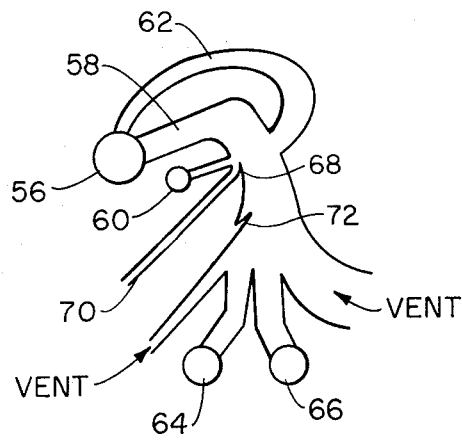
FIG. 2 is a schematic view of the type of fluid amplifier used in this invention.

The fluid amplifiers 26 and 28 respectively control the flow of the two fluids 10 and 12 so as to permit mixing thereof in any desired ratio. The amplifiers 26 and 28 are controlled by flow signals tapped off from the venturi orifice 36 on the mixture line 38. However, the hand valves 40 and 42 are provided to further control the fluids in the event of a necessity. As shown, excess fluids are returned via lines 44 and 46 to supply tanks 14 and 16 respectively. The amplifiers employed herein are capable of modulating the output flow from full flow to zero. A double leg elbow type of proportional amplifier is preferred and is shown in FIG. 2. It will be noted that this type of amplifier comprises a supply port 56 through which fluid enters the amplifier and continues through the active leg 58 which is controlled by a low energy flow through the control port 60 creating suction. Further, the flow through the passive leg 62 of the amplifier combines with the primary fluid flow and forms a combined jet. The combined jet depending upon the amount of control flow divides itself proportionally into the two output ports 64 and 66. The purpose of the splitter vane 68 is to change the momentum flux by bleeding some of the flow through port 70. The function of the spoiler 72 on one of the walls is to avoid permanent attachment of the combined jet to the wall. Obviously, this amplifier is a very high gain device.

The variable resistors 48 and 50 are positioned on the control lines 52 and 54 of the fluid amplifiers 26 and 28 and are designed to change the mixture ratio of fluids. These variable resistors are fluidic passive devices consisting of a resistance path of controlled variable length. The resistance of these resistors is linear and they are fabricated of corrosion resistant materials. In systems which operate at a given fixed mixture ratio, fixed resistors may be used which may be easily replaced for specific changes in mixture ratio.

Thus, it is seen that the present invention uniquely uses fluid amplifiers to meter the flow of each fluid, a concept novel in the art.

Obviously, many modifications and variations of the present invention are possible in the light of the above teachings. It is therefore to be understood that within the scope of the appended claims the invention may be practiced otherwise than as specifically described.

What is claimed is:

1. A fluidic system for mixing two fluids comprising:
   at least two sources of fluids;
   a pair of double legs elbow proportional fluid amplifiers; each of said fluid amplifiers comprised of a supply port through which fluid enters an active leg and a passive leg the flow through the passive leg combining with the flow through the active leg to form a combined jet; a low energy control port adjacent to the active leg for creating a suction; means for changing the momentum flux of the flow; means for preventing the permanent attachment of the combined jet to the amplifier wall; and two output ports dividing the controlled flow proportionally;

a pair of fluid lines attached to each of said fluid sources and adapted to supply the fluids to each respective fluid amplifier;

a pair of second fluid lines connected to one output port of each fluid amplifier respectively and adapted to supply the fluids in selected mass to a mixing junction;

a pair of third fluid lines connected to each amplifier respectively for controlling the flow of each fluid to the mixing junction, said third fluid lines being connected to a tap on a mixture line coming from the mixing junction to supply flow signals to each amplifier respectively; and at least two variable fluidic passive resistors positioned in said third fluid lines and adapted to change the mixture ratio of the fluids.

2. The fluidic system of claim 1 wherein the means for changing the momentum flux of the flow comprises:
 a bleeding port adjacent to the control port; and
 a splitter vane adjacent to the input of the bleeding port.

3. The fluidic system of claim 2 wherein the means for preventing permanent attachment of the combined jet to the amplifier wall comprises:
 a spoiler adjacent to the splitter vane.

4. A fluidic system as defined in claim 3 wherein:
 a pressure tap unit is positioned adjacent a venturi orifice on each of said second fluid lines to measure the flow signals emitted from said orifice and thereby control each of the amplifiers.

5. The fluidic system of claim 3 wherein the variable fluidic resistors are of controlled length.

* * * * *